US011124310B2

(12) United States Patent
Scimone

(10) Patent No.: US 11,124,310 B2
(45) Date of Patent: Sep. 21, 2021

(54) PRESSURE RECOVERY DEVICE FOR AN AIRCRAFT ENGINE AIR INTAKE

(71) Applicant: DMS Aviation Services LLC, Wildwood, MO (US)

(72) Inventor: Michael J. Scimone, Wildwood, MO (US)

(73) Assignee: DMS Aviation Services, LLC, Wildwood, MO (US)

(*) Notice: Subject to any disclaimer, the term of this patent is extended or adjusted under 35 U.S.C. 154(b) by 350 days.

(21) Appl. No.: 16/389,721

(22) Filed: Apr. 19, 2019

(65) Prior Publication Data

US 2020/0023985 A1   Jan. 23, 2020

Related U.S. Application Data

(63) Continuation-in-part of application No. 15/949,815, filed on Apr. 10, 2018, now Pat. No. 10,266,275.

(51) Int. Cl.
*B64D 33/02* (2006.01)
*B64D 33/04* (2006.01)

(52) U.S. Cl.
CPC ............ *B64D 33/02* (2013.01); *B64D 33/04* (2013.01); *B64D 2033/022* (2013.01); *B64D 2033/0253* (2013.01)

(58) Field of Classification Search
CPC .............. B64D 33/02; B64D 2033/022; B64D 2033/0253; B64D 33/04
USPC ...................................................... 244/53 B
See application file for complete search history.

(56) References Cited

U.S. PATENT DOCUMENTS

| 2,319,894 A * | 5/1943 | Vokes ............... B01D 46/0023 244/1 R |
| 2,352,790 A | 7/1944 | Jordan |
| 2,381,705 A | 8/1945 | Vokes |
| 2,405,102 A | 7/1946 | Vokes |
| 2,407,194 A | 9/1946 | Vokes |
| 2,546,153 A | 3/1951 | De Remer |
| 3,329,377 A | 7/1967 | Peterson et al. |
| 3,721,406 A | 3/1973 | Hurlbert |
| 3,950,157 A | 4/1976 | Matney |
| 4,174,083 A | 11/1979 | Mohn |
| 4,190,217 A | 2/1980 | O'Connor |
| 4,346,860 A | 8/1982 | Tedstone |
| 4,397,431 A | 8/1983 | Ben-Porat |
| 4,418,879 A | 12/1983 | Vanderleest |

(Continued)

FOREIGN PATENT DOCUMENTS

GB       2509886 A       7/2014

*Primary Examiner* — Brady W Frazier
(74) *Attorney, Agent, or Firm* — Armstrong Teasdale LLP

(57) ABSTRACT

An aircraft includes a fuselage, an engine exhaust port extending through the fuselage, an air intake extending through the fuselage forward from, and adjacent to, the engine exhaust port, and an air cleaning assembly positioned over the air intake. The aircraft also includes a pressure recovery device including an outer wall positioned above the air cleaning assembly. A distance from a forward edge of the outer wall to the air cleaning assembly is greater than a distance from an aft edge of the outer wall to the air cleaning assembly. An inlet flow axis is defined normal to a cross-sectional flow area of the pressure recovery device at the forward edge, and is oriented upward at an acute angle relative to a longitudinal axis of the aircraft.

20 Claims, 12 Drawing Sheets

(56) References Cited

U.S. PATENT DOCUMENTS

| | | |
|---|---|---|
| 4,502,875 A | 3/1985 | Ballard |
| 5,490,644 A | 2/1996 | Konscek et al. |
| 5,662,292 A | 9/1997 | Greene et al. |
| 6,056,237 A | 5/2000 | Woodland |
| 6,247,668 B1 | 6/2001 | Reysa et al. |
| 6,349,899 B1 | 2/2002 | Ralston |
| 6,595,742 B2 | 7/2003 | Scimone |
| 7,452,395 B2 | 11/2008 | Fiello et al. |
| 7,597,283 B2 | 10/2009 | Hernanz Mannque et al. |
| 7,600,714 B2 | 10/2009 | Sheoran et al. |
| 9,254,924 B2 | 2/2016 | Nager et al. |
| 9,409,653 B2 | 8/2016 | Ahmad et al. |
| 9,574,497 B2 | 2/2017 | Dailey et al. |
| 2002/0182062 A1* | 12/2002 | Scimone ............... B64D 33/02 415/121.2 |
| 2006/0102779 A1 | 5/2006 | Campbell et al. |
| 2006/0196993 A1 | 9/2006 | Hein et al. |
| 2009/0261208 A1* | 10/2009 | Belyew ............... F02C 7/052 244/53 B |
| 2012/0292455 A1 | 11/2012 | DeDe et al. |
| 2013/0001369 A1* | 1/2013 | Light ............... B64D 33/02 244/53 B |
| 2013/0037122 A1* | 2/2013 | Nager ............... B64D 41/00 137/15.1 |
| 2013/0087661 A1 | 4/2013 | Brown et al. |
| 2013/0087663 A1 | 4/2013 | Dailey et al. |
| 2013/0092798 A1* | 4/2013 | Boyce ............... B01D 46/12 244/53 B |
| 2013/0168502 A1 | 7/2013 | Da Silva et al. |
| 2014/0158833 A1* | 6/2014 | Braeutigam ........... B64D 33/02 244/53 B |
| 2015/0314883 A1* | 11/2015 | Judas ............... B64D 33/02 244/53 B |
| 2016/0075439 A1 | 3/2016 | Mores et al. |
| 2016/0237898 A1 | 8/2016 | Poisson et al. |
| 2018/0093779 A1 | 4/2018 | Ainslie |

\* cited by examiner

PRESSURE RECOVERY DEVICE FOR AN AIRCRAFT ENGINE AIR INTAKE

CROSS REFERENCE TO RELATED APPLICATIONS

This application is a continuation-in-part of, and claims priority to, U.S. application Ser. No. 15/949,815, filed Apr. 10, 2018, the disclosure of which is incorporated by reference in its entirety.

FIELD

This disclosure relates to aircraft engine air intakes, and in particular to intakes having filters, inertial particle separators or similar air permeable covers.

BACKGROUND

Some known air intakes for aircraft engines include an inlet that generally conforms to a surface contour of the aircraft adjacent the intake. Such intakes may include a filter, air permeable cover or similar device that has an outer surface generally conformal to the local contour of the aircraft skin.

In some cases, a dynamic pressure of air flow into such an intake varies significantly with the flight condition of the aircraft. For example, some rotary aircraft include an air intake that faces generally upward, such that the outer surface of the air permeable cover is generally perpendicular to air flow at the intake while the aircraft is hovering, and generally parallel to airflow at the intake when the aircraft is in forward flight. As a result, the intake airflow in the forward flight condition has a significantly lower dynamic pressure than in the hover condition, which may result in comparatively reduced engine performance, or negatively affect performance, in forward flight. In at least some cases, it may be desirable to at least partially recover the dynamic pressure at the air intake in the forward flight condition. Moreover, an air intake that faces generally upward tends to expose the filter media to ultraviolet radiation from the sun, or other environmental conditions which may accelerate the degradation of the filter media and necessitate more frequent replacements of the filter assembly and/or filter media. Environmental conditions such as hail, driving rain, heavy snow or other airborne debris can damage the filter assembly and or filter media.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

In one aspect, an aircraft is disclosed. The aircraft includes a fuselage, an engine exhaust port extending through the fuselage, an air intake extending through the fuselage forward from, and adjacent to, the engine exhaust port, and an air cleaning assembly positioned over the air intake. The aircraft also includes a pressure recovery device including an outer wall positioned above the air cleaning assembly. A distance from a forward edge of the outer wall to the air cleaning assembly is greater than a distance from an aft edge of the outer wall to the air cleaning assembly. An inlet flow axis is defined normal to a cross-sectional flow area of the pressure recovery device at the forward edge, and is oriented upward at an acute angle relative to a longitudinal axis of the aircraft.

In another aspect, a method of shielding an air intake of an aircraft against engine exhaust gas recirculation is disclosed. The aircraft includes a fuselage, an engine exhaust port extending through the fuselage, and an air intake extending through the fuselage forward from, and adjacent to, the engine exhaust port. The method includes positioning a pressure recovery device over the air intake. An air cleaning assembly is interposed between ambient air and the air intake, and a distance from a forward edge of an outer wall of the pressure recovery device to the air cleaning assembly is greater than a distance from an aft edge of the outer wall to the air cleaning assembly. The method also includes orienting an inlet flow axis of the pressure recovery device upward at an acute angle relative to a longitudinal axis of the aircraft. The inlet flow axis is defined normal to a cross-sectional flow area of the pressure recovery device at the forward edge.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Corresponding reference characters indicate corresponding parts throughout the several views of the drawings.

DETAILED DESCRIPTION

Figure 1:
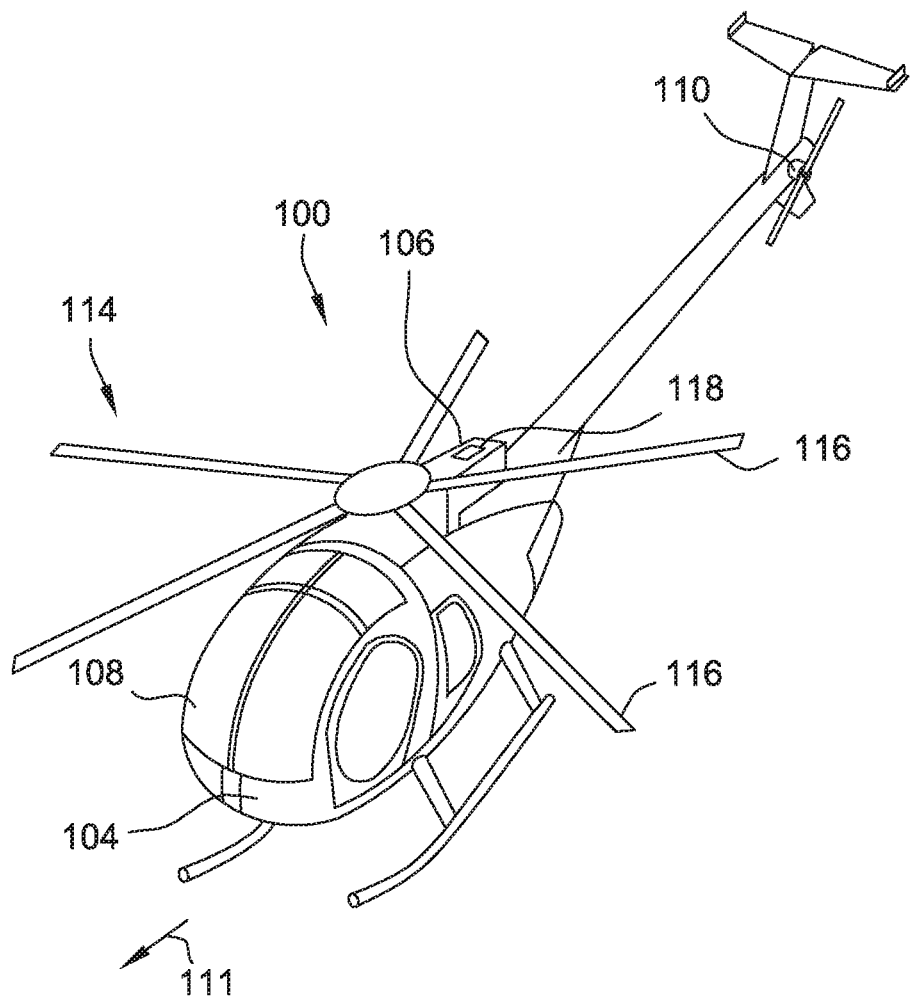
FIG. 1 is a perspective view of an aircraft of one embodiment.

FIG. 1 is a perspective view of an embodiment of an aircraft 100. Aircraft 100 is illustrated as a helicopter, and includes a generally horizontal primary rotor assembly 114 and a generally vertical tail rotor 110. Primary rotor assembly 114 includes a plurality of rotor blades 116. Alternatively, aircraft 100 may be, without limitation, another rotorcraft, a fixed wing airplane, a lighter than air vehicle, or combinations thereof. Aircraft 100 further includes a fuselage 104, a cowling 106 mounted on the fuselage, and a cockpit 108. Propulsion power is provided by a suitable engine (not shown) housed within the fuselage 104 and/or cowling 106, such as a suitable turbine or piston internal combustion engine. An air intake assembly 118 is positioned on the cowling 106 and is configured to channel air from outside the fuselage 104 into an engine air intake 120 (shown in FIG. 2). Alternatively, the air intake assembly 118 may be positioned at any suitable location on the fuselage 104. The aircraft 100 is associated with a direction of forward flight 111.

Figure 2:
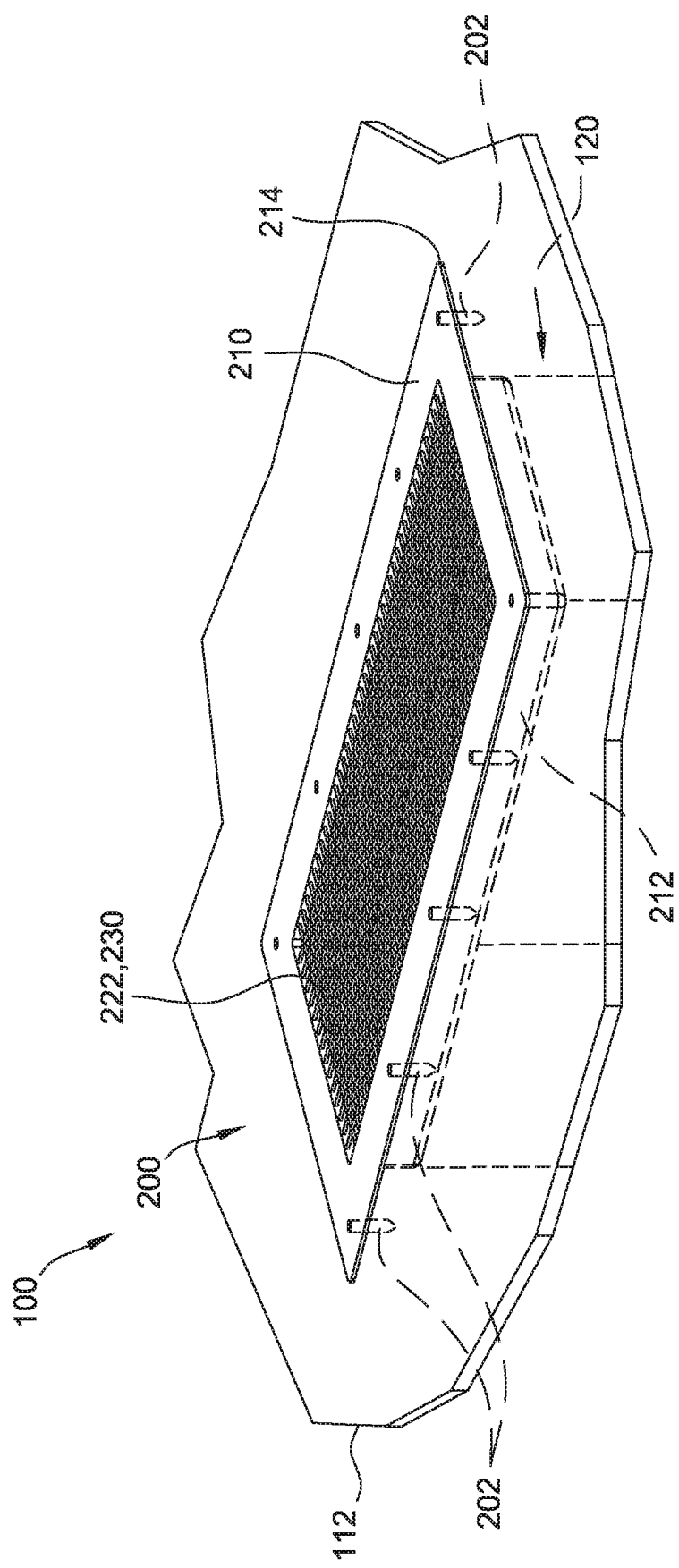
FIG. 2 is a perspective view of an embodiment of an air cleaning assembly of an air intake assembly of the aircraft shown in FIG. 1.
Figure 3:
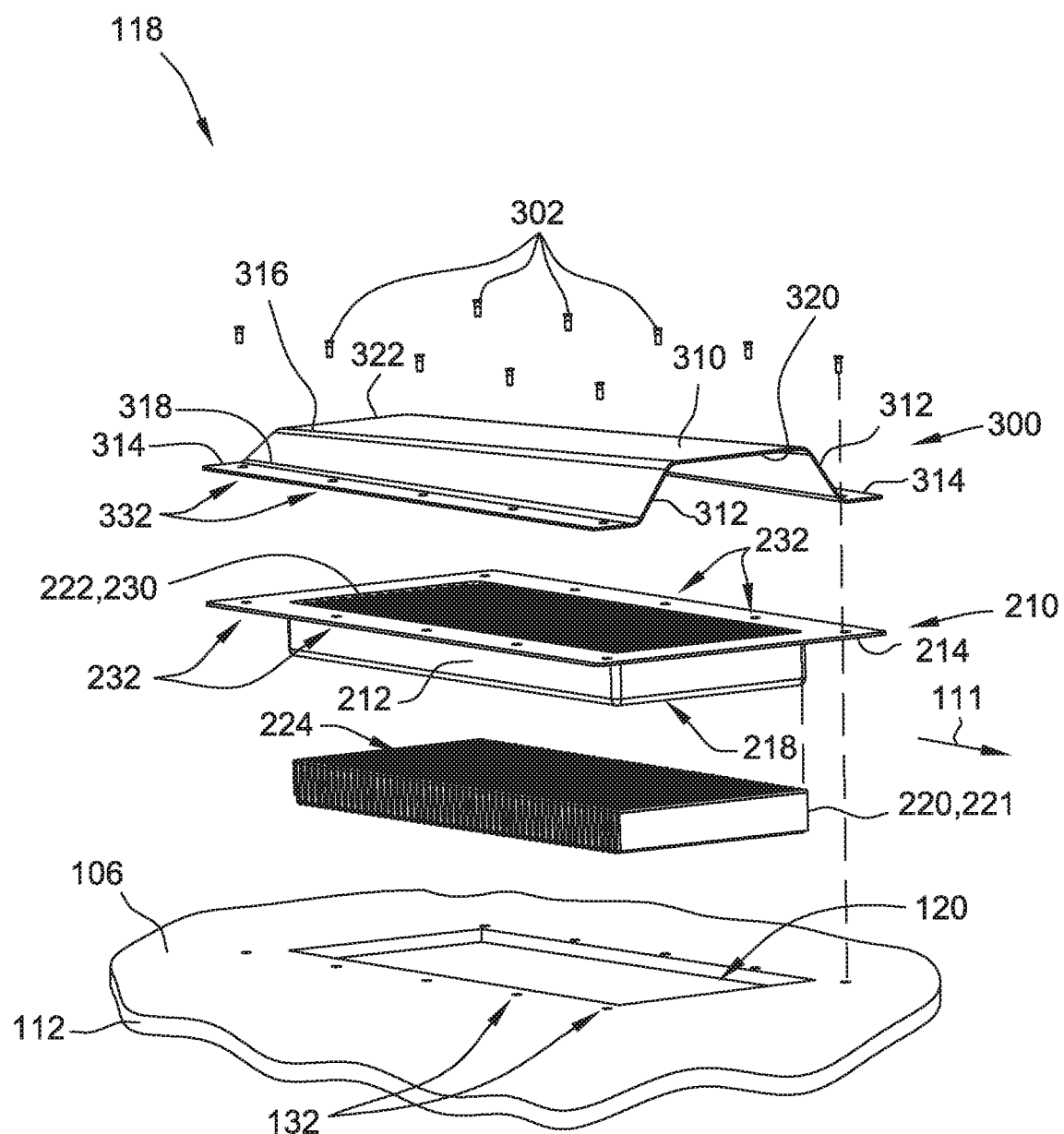
FIG. 3 is an exploded perspective view of a pressure recovery device co-mounted with the air cleaning assembly shown in FIG. 2.

FIG. 2 is a perspective view of an embodiment of an air cleaning assembly 200 of the air intake assembly 118 of the aircraft 100. FIG. 3 is an exploded perspective view of a pressure recovery device 300 co-mounted with the air cleaning assembly 200. In the illustrated embodiment, the aircraft 100 is in a first condition (e.g., initially manufactured or delivered) without the pressure recovery device 300, and the pressure recovery device 300 is retrofitted or co-mounted with the air cleaning assembly 200 in a retrofitting process. In alternative embodiments, the aircraft 100 is initially manufactured with the pressure recovery device 300 co-mounted with the air cleaning assembly 200.

The air cleaning assembly 200 includes a retention frame 210 mounted in the cowling 106 and an air cleaning device 220 retained in the retention frame. More specifically, the retention frame 210 interposes the air cleaning device 220 between the ambient air and the engine air intake, so that intake air is drawn through the air cleaning device 220 for removal of particulates before flowing to the engine of the aircraft 100.

The retention frame 210 includes a basket 212 sized to be received in the engine air intake 120 in a clearance fit. The basket 212 defines an interior cavity 218 sized to receive the air cleaning device 220. In the illustrated embodiment, the retention frame 210 also includes a screen 222 that defines an exterior boundary of the interior cavity 218. The screen 222 defines a plurality of openings sized to inhibit debris and foreign objects in the environment surrounding the aircraft 100 from reaching the air cleaning device 220 positioned beneath the screen. Moreover, the basket 212 and the screen 222 are configured to cooperate to securely retain the air cleaning device 220 in place within the basket 212, yet allow for its easy replacement. In alternative embodiments, the retention frame 210 is configured to retain the air cleaning device 220 in any suitable fashion that enables the air cleaning assembly 200 to function as described herein.

In the illustrated embodiment, the air cleaning device 220 is a filter 221, formed from a pleated filter medium, and the basket 212 is configured to retain an upper contour 224 of the filter 221 against an inner surface of the screen 222. For example, the filter 221 is a pleated sheet of porous material that has a particle removal efficiency of at least about 96% of AC Coarse dust particles and at least about 95% of AC Fine dust particles from the intake air. As known in the art, AC Coarse (defined in Society of Automotive Engineers (SAE) J726 Air Cleaner Test Code) dust has particle sizes ranging from 0 to 200 microns and mean diameter of about 80 microns, and AC Fine dust has particle sizes ranging from 0 to 80 microns and mean diameter of about 8 microns. In alternative embodiments, the retention frame 210 is configured to retain any suitable device 220 for cleaning and/or conditioning the ambient air channeled into the engine air intake 120, such as, but not limited to, an inertial particle separator (e.g., vortex) air cleaner device (not shown).

The retention frame 210 also includes a lip 214 that extends around at least a portion of the perimeter of the basket 212. For example, in the illustrated embodiment, the lip 214 extends around an entirety of the perimeter of the basket 212. The lip 214 is configured to extend over an outer skin 112 of the aircraft 100 surrounding the air intake assembly 118 in face-to-face contact when the retention frame 210 is installed.

An exemplary material for the retention frame 210 is aluminum, although the particular structure of the frame may vary by the type of aircraft and its specific design and configuration.

Figure 8:
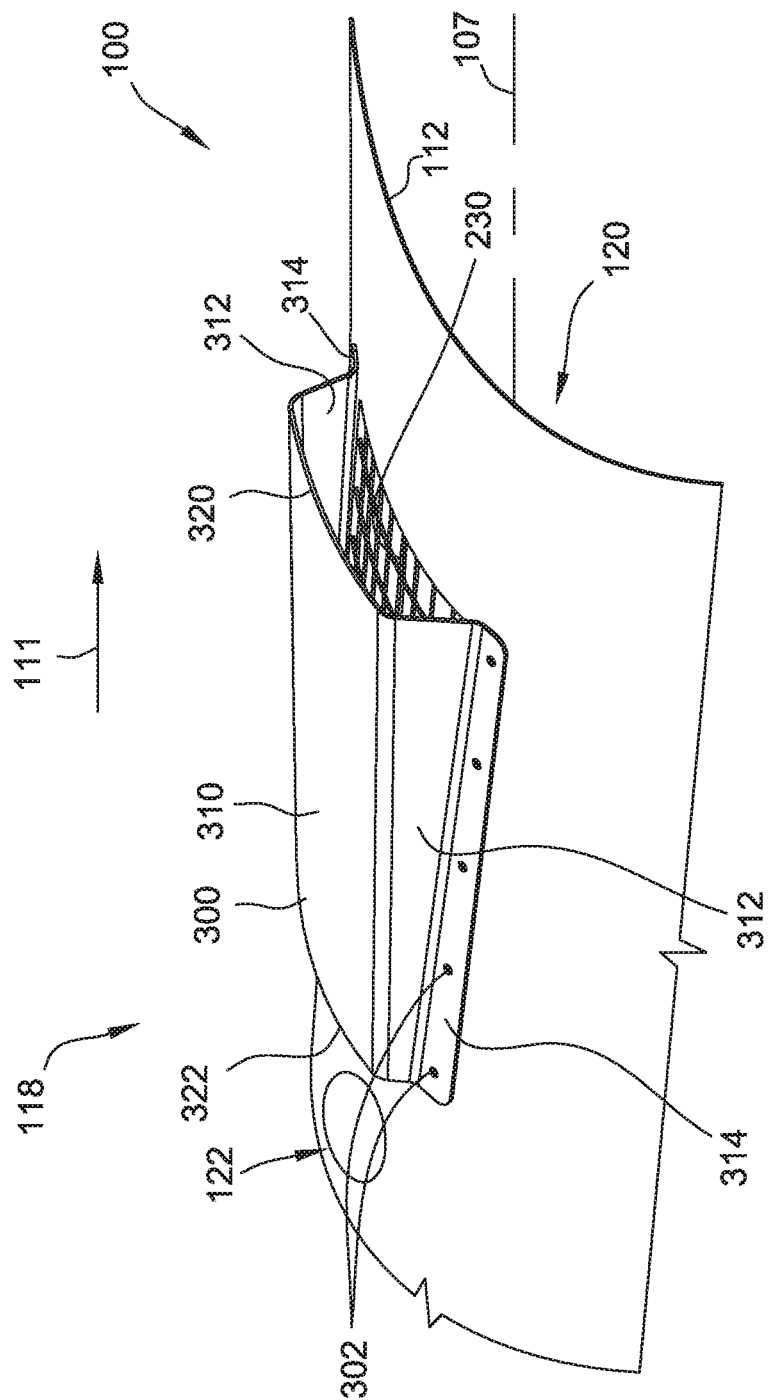
FIG. 8 is a perspective view of an embodiment of an air intake assembly of the aircraft shown in FIG. 7.

The retention frame 210 is substantially conformal, i.e., positioned along or within, a moldline of the outer skin 112 of the aircraft 100. More specifically, the lip 214 is flush with the outer skin 112 surrounding the air intake assembly 118 (e.g., the outer skin 112 surrounding the air intake assembly 118 is recessed to accommodate a thickness of the lip 214), slightly below flush, or slightly above flush (e.g., the outer skin 112 is not recessed). In addition, an exterior surface 230 of the air cleaning assembly 200 over the engine air intake 120, defined by the screen 222 in the illustrated embodiment, is contoured to conform to a contour of the outer skin 112 surrounding the air intake assembly 118. For example, in the illustrated embodiment, the contour of the outer skin 112 surrounding the air intake assembly 118 is flat, and the exterior surface 230 is also flat. Alternatively, the contour of the outer skin 112 surrounding the air intake assembly 118 is curved, as shown in FIG. 8 for example, and the exterior surface 230 has a curvature that matches the curved contour of the surrounding outer skin 112.

The pressure recovery device 300 includes an outer wall 310 that extends over at least a portion of the basket 212 in a spaced-apart relationship. More specifically, the outer wall 310 extends across the portion of the basket 212 between a pair of opposing side edges 316 that are generally parallel to the direction of forward flight 111. The outer wall 310 also extends from a forward edge 320 to an aft edge 322.

The pressure recovery device 300 also includes a pair of side walls 312. Each side wall 312 is connected to a respective side edge 316 of the outer wall 310 and extends generally inward from the outer wall 310 to an inner edge 318 adjacent to the retention frame 210. The pressure recovery device 300 further includes a pair of flanges 314 each connected to the inner edge 318 of a respective side wall 312. More specifically, the flanges 314 are configured to extend over the lip 214 of the retention frame 210 in face-to-face contact when the pressure recovery device 300 is installed, such that the flange, the lip, and the outer skin underneath the lip are substantially parallel, and the side walls 312 are configured to space the outer wall 310 apart from the basket 212. A plurality of openings 332 is defined in the flanges 314, and each opening 332 is configured to align with a respective opening 132 defined in the outer skin 112 and a respective opening 232 defined in the lip 214 of the retention frame 210.

In some embodiments, the pressure recovery device 300 is formed relatively simply and inexpensively by stamping and folding a single piece of sheet metal to form outer wall 310, side walls 312, and flanges 314. In alternative embodiments, the pressure recovery device 300 is formed in any suitable fashion, from any suitable materials and any suitable number of individual components.

In the illustrated embodiment, for the aircraft 100 as initially delivered, that is, before the pressure recovery device 300 is installed, the retention frame 210 is secured to the cowling 106 by a plurality of initial fasteners 202 (shown in FIG. 2). In alternative embodiments, the retention frame 210 is secured to the cowling 106 in any suitable fashion that enables the retention frame 210 to function as described herein. In the illustrated embodiment, each initial fastener 202 is sized to extend through a respective opening 232 in the lip 214 of the frame 210, and into an aligned respective opening 132 in the outer skin 112. For example, the initial fasteners 202 are metal bolts or screws having a length selected to fit the aligned openings 232 and 132. Alternatively, the initial fasteners 202 are any suitable fasteners that enable the retention frame 210 to function as described herein. The initial fasteners 202 have a rated strength selected to secure, with the appropriate safety factors, the air cleaning assembly 200 to the aircraft 100.

In the illustrated embodiment, to install the pressure recovery device 300 in a retrofit process, the initial fasteners 202 are removed from the corresponding pairs of aligned openings 132 and 232 defined respectively in the outer skin 112 and the lip 214. The pressure recovery device 300 is positioned over the air cleaning assembly 200 such that the openings 332 in the flanges 314 register with the aligned openings 132 and 232. A plurality of replacement fasteners 302 (shown in FIG. 3) is then installed into each aligned trio of openings 332, 232, and 132. The replacement fasteners 302 have certain size parameters (e.g., diameter, thread configuration) substantially identical to the initial fasteners 202, in order to be received in and cooperate with the opening 232 in the lip 214 of the air cleaning assembly 200 and the opening 132 in the outer skin 112. However, in some embodiments, the replacement fasteners 302 have a greater length than the initial fasteners 202 to accommodate a thickness of the flange 314. Additionally or alternatively, in certain embodiments, the replacement fasteners 302 have a greater rated strength than the initial fasteners 202 to ensure that the pressure recovery device 300, which during operation of aircraft 100 typically encounters higher dynamic forces than the air cleaning assembly 200 by itself prior to the retrofit, is suitably secured to the aircraft 100. In alternative embodiments, the initial fasteners 202 have sufficient length and/or strength to be re-used in the retrofit process. In other alternative embodiments, the aircraft 100 is initially manufactured or delivered with the pressure recovery device 300, and the initial fasteners 202 are accordingly sized at the time of manufacture.

Figure 4:
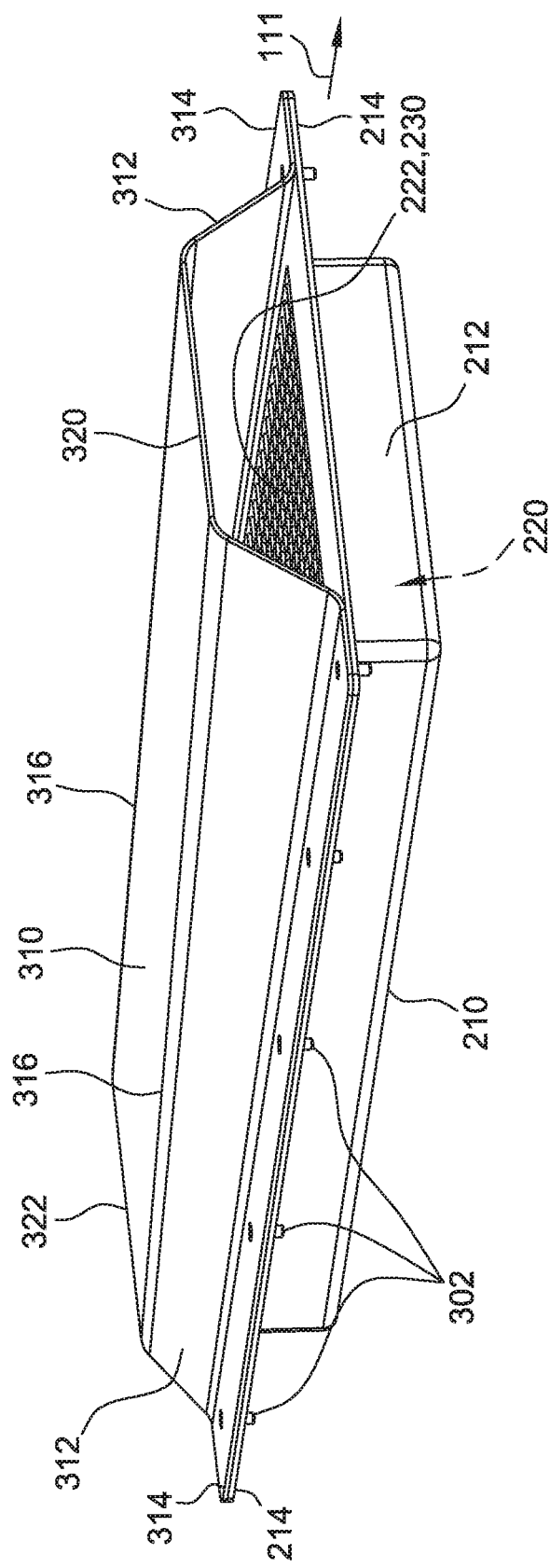
FIG. 4 is a perspective view of the pressure recovery device shown in FIG. 3 co-mounted with the air cleaning assembly shown in FIG. 3.
Figure 5:
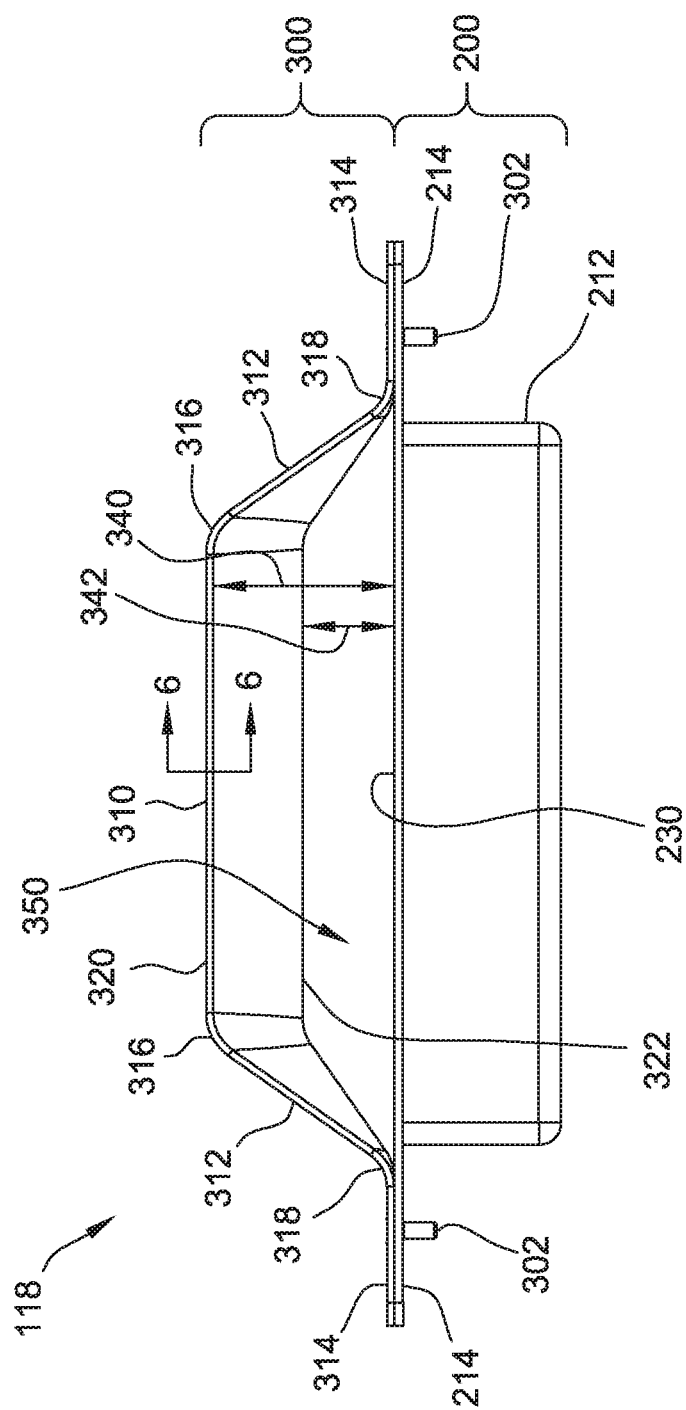
FIG. 5 is a front elevation view of the pressure recovery device shown in FIG. 3 co-mounted with the air cleaning assembly shown in FIG. 3.

FIG. 4 is a perspective view of the pressure recovery device 300 co-mounted with the air cleaning assembly 200 to form the air intake assembly 118. FIG. 5 is a front elevation view, i.e., with the forward flight direction 111 pointing normal to and out of the page, of the air cleaning assembly 200 and the co-mounted pressure recovery device 300. As can be seen, the outer wall 310 generally slopes downward and afterward relative to the exterior surface 230 of the air cleaning assembly 200. More specifically, a distance 340 from the forward edge 320 of the outer wall 310 to the air cleaning assembly 200 is greater than a distance 342 from the aft edge 322 of the outer wall 310 to the air cleaning assembly 200. As can be seen in FIG. 5, the distance from the outer wall 310 to the air cleaning assembly 200 is measured normal to the exterior surface 230 of the air cleaning assembly 200. Moreover, the distance from the outer wall 310 to the air cleaning assembly 200 generally tapers between the forward edge 320 and the aft edge 322, such that a cross-sectional flow area of the pressure recovery device 300 likewise tapers between the forward edge 320 to the aft edge 322. The cross-sectional flow area is defined normal to the forward flight direction 111 of the aircraft 100. In the illustrated embodiment, the outer wall 310 slopes linearly from the forward edge 320 down towards the aft edge 322. In alternative embodiments, the distance between the outer wall 310 and the exterior surface 230 is tapered in any suitable fashion that enables the pressure recovery device 300 to function as described herein.

The afterward tapering of the cross-sectional flow area of the pressure recovery device 300, as described above, facilitates a more level pressure recovery versus velocity curve for the air intake assembly 118 as the aircraft 100 transitions from hovering into forward flight. More specifically, when the aircraft 100 is taking off vertically or hovering, a dynamic pressure of ambient air entering the air cleaning assembly 200 is primarily driven by downwash from the rotor assembly 114. Exterior surface 230 of the air cleaning assembly 200 is shielded by outer wall 310 from direct impingement, but the relatively uniform vertical speed of the ambient air on all sides of the pressure recovery device 300 provides ram air pressure to the intake air resulting in a relatively high pressure recovery across the air cleaning assembly 200. When the aircraft 100 transitions into forward motion, the forward velocity of the ambient air becomes greater than the downwash velocity, so that exterior surface 230 is now oriented parallel to the primary direction of flow. In the absence of the pressure recovery device 300, the pressure recovery at the engine from parallel flow over the surface 230 of the air cleaning assembly 200 would be greatly reduced. However, the tapering cross-sectional flow area defined by the pressure recovery device 300 over the exterior surface 230 tends to increase the ram air pressure into the air cleaning assembly 200 in concert with increasing air speed in the direction of forward flight 111. Thus, in either hover or forward flight, the engine air intake 120 receives air with good pressure recovery through the air cleaning assembly 200 so that pressure drop across the air intake assembly 118 is somewhat constant with airspeed. The pressure of intake air provided to the engine is thus stabilized during transitional flight, and enhances engine performance during forward flight. It should also be noted that, in some embodiments, the outer wall 310 extending over at least a portion of the basket 212 in a spaced-apart relationship facilitates shielding the filter 221 from ultraviolet radiation from the sun, thus slowing the degradation of the filter media and resulting in less frequent replacements of the filter 221.

In the illustrated embodiment, the distance 342 from the aft edge 322 of the outer wall 310 to the air cleaning assembly 200 is non-zero, such that a gap 350 is defined between the aft edge 322 of the outer wall and the air cleaning assembly 200. More specifically, the gap 350 is sized to enable snow, ice, or other airborne particulates captured at the forward edge 320 to pass through the pressure recovery device 300 and exit the aft edge 322, thereby limiting obstruction to the air flow into the air cleaning assembly 200.

In some embodiments, a size of the pressure recovery device 300 is selected to tailor a pressure recovery profile. For example, in the illustrated embodiment, the forward edge 320 of the outer wall 310 extends forward of a forward edge of the filter 221, which increases the ram air pressure into the air cleaning assembly 200 relative to a more aft positioning of the forward edge 320 of the outer wall. Additionally or alternatively, the aft edge 322 of the outer wall 310 extends aft of an aft edge of the filter 221.

Figure 6:
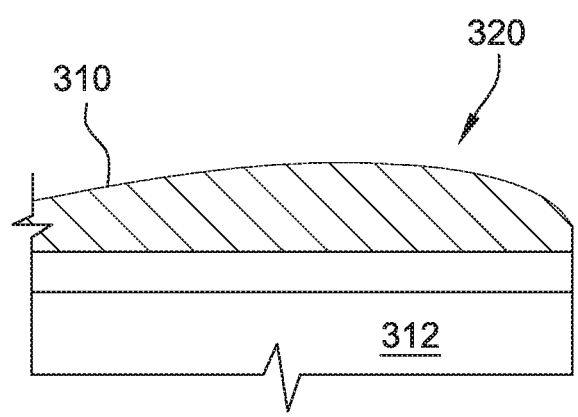
FIG. 6 is a sectional view, taken along lines 6-6 shown in FIG. 5, of an embodiment of a forward edge of an outer wall of the pressure recovery device shown in FIG. 3.

FIG. 6 is a sectional view, taken along lines 6-6 shown in FIG. 5, of an embodiment of the forward edge 320 of outer wall 310 of the pressure recovery device 300. In the illustrated embodiment, forward edge 320 defines an airfoil shape. In some embodiments, the airfoil shape of forward edge 320 reduces drag of an airflow over pressure recovery device 300 during forward flight of aircraft 100. In alternative embodiments, forward edge 320 of outer wall 310 defines any suitable shape that enables pressure recovery device 300 to function as described herein.

Figure 7:
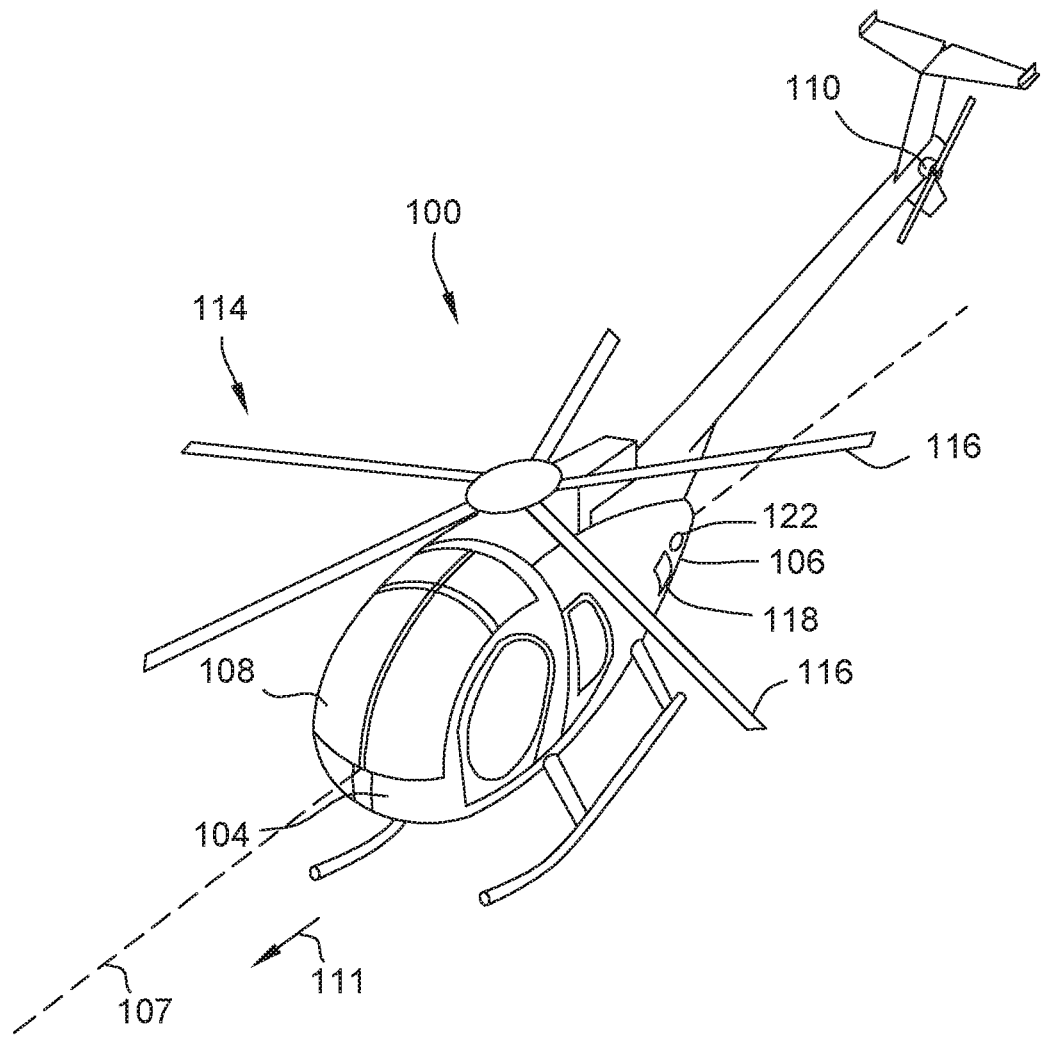
FIG. 7 is a perspective view of an aircraft of another embodiment.

FIG. 7 is a perspective view of another embodiment of the aircraft 100. The illustrated aircraft 100 is similar to the aircraft of FIG. 1, but includes the air intake assembly 118 positioned on another cowling 106 at a different location on the fuselage 104, just forward of an engine exhaust port 122 with respect to a longitudinal axis 107 of the aircraft 100 that extends from a nose to a tail of the aircraft 100. Alternatively, the air intake assembly 118 may be positioned at any suitable location on the fuselage 104.

FIG. 8 is a perspective view of an embodiment of the air intake assembly 118 of the aircraft 100 shown in FIG. 7. The air intake assembly 118 is similar to the air intake assembly shown in FIG. 3, except for the following differences. The contour of the outer skin 112 surrounding the air intake assembly 118 is curved, and the exterior surface 230 of the air cleaning assembly 200 has a curvature that matches the curved contour of the surrounding outer skin 112. The outer wall 310 of the pressure recovery device 300 is likewise curved to follow the contour of the exterior surface 230 as the outer wall slopes downward and afterward, again defining the tapered cross-sectional flow area and providing the pressure recovery benefits discussed above. In the illustrated embodiment, the flanges 314 of the pressure recovery device 300 are also contoured to fit flush against the lip 214 (shown in FIG. 3) of the air cleaning assembly 200. In some embodiments, in addition to the other benefits described above, the pressure recovery device 300 extending over at least a portion of the exterior surface 230 also facilitates protecting the air intake 120 against exhaust gas recirculation from the exhaust port 122 in close proximity. In effect, the pressure recovery device 300 acts as a shield against the hot exhaust gas from the port 122, inhibiting the entry of hot exhaust gas into the intake 120. Moreover, the pressure recovery device 300 may be added to existing air cleaning assemblies 200 in a retrofit process as described above, advantageously improving a performance envelope of existing aircraft in a relatively fast and inexpensive fashion.

As shown in FIG. 8, the cross-sectional flow area of the pressure recovery device 300 at the forward edge 320 of the outer wall 310 is oriented generally normal to the longitudinal axis 107 of the aircraft 100. In other words, the opposing side walls 312 are oriented generally parallel to the longitudinal axis 107 and the forward flight direction 111. An advantage of the illustrated orientation of the pressure recovery device 300 is that the resulting dynamic pressure recovery for the engine air intake 120 is substantially increased when the aircraft travels in the forward flight direction 111.

Figure 9:
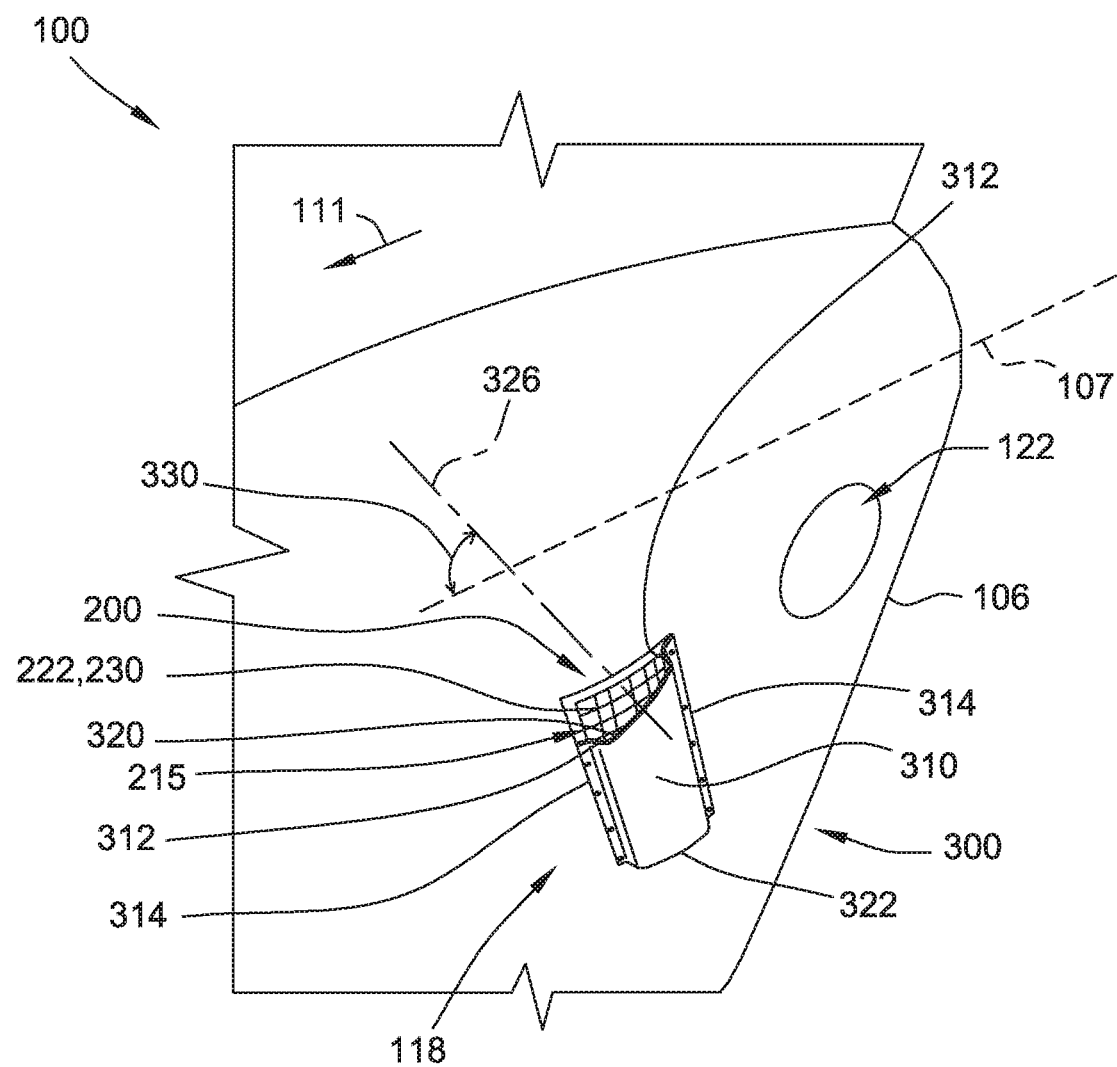
FIG. 9 is a perspective view of another embodiment of the air intake assembly of the aircraft shown in FIG. 7, in which an embodiment of a pressure recovery device has a canted forward edge.
Figure 10:
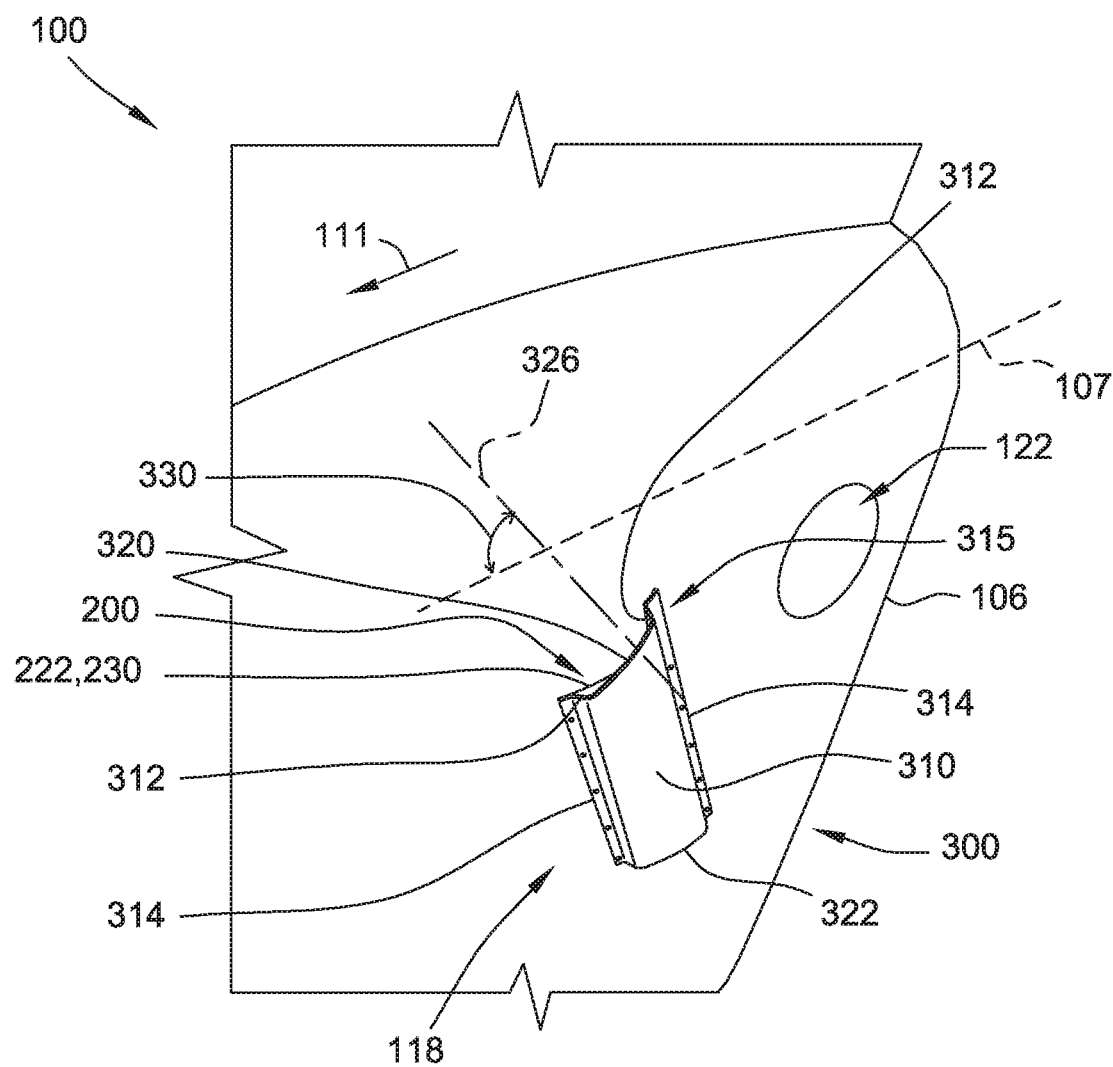
FIG. 10 is a perspective view of another embodiment of the air intake assembly of the aircraft shown in FIG. 7, in which another embodiment of the pressure recovery device has a canted forward edge.
Figure 11:
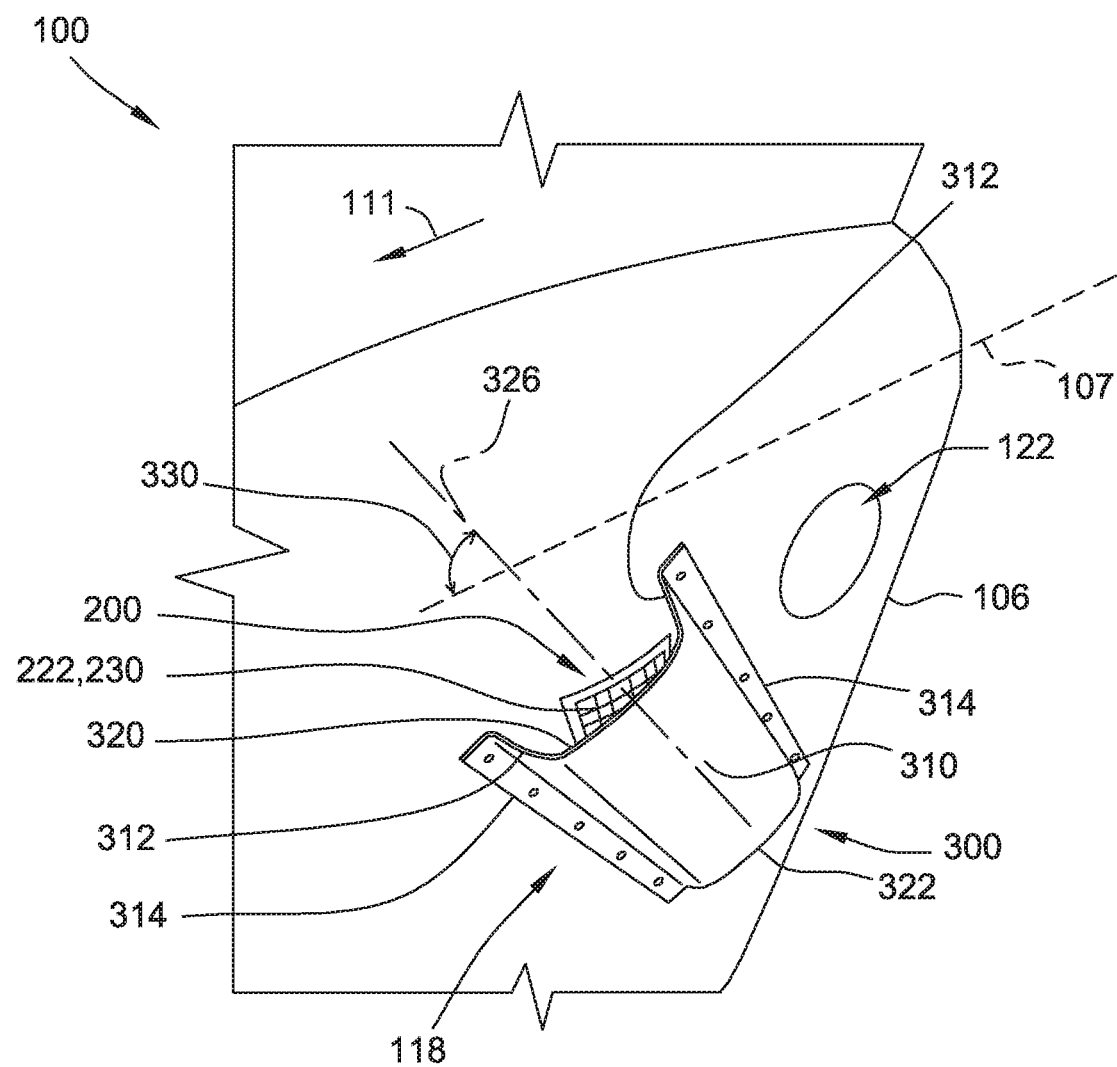
FIG. 11 is a perspective view of another embodiment of the air intake assembly of the aircraft shown in FIG. 7, in which the pressure recovery device is oriented at an acute angle relative to a longitudinal axis of the aircraft.

FIGS. 9-11 are perspective views of additional embodiments of the air intake assembly 118 of the aircraft 100 shown in FIG. 7. In each of the embodiments of FIGS. 9-11, an inlet flow axis 326 of the pressure recovery device 300 is oriented upward at an acute angle 330 relative to the longitudinal axis 107 of the aircraft 100. The acute angle 330 of the inlet flow axis 326 provides certain advantages in enabling dynamic pressure recovery while inhibiting re-ingestion of exhaust gases from the exhaust port 122, as will be described below. The inlet flow axis 326 is defined normal to a cross-sectional flow area of the pressure recovery device 300 at the forward edge 320, and the acute angle 330 may be achieved in several different ways.

For example, the air intake assembly 118 illustrated in FIG. 9 is similar to the air intake assembly shown in FIG. 8, except as described below. First, the flanges 314 of the pressure recovery device 300 are rotated 90 degrees relative to the orientation in FIG. 8, such that the opposing side walls 312 are aligned generally vertically. As a result, one of the side walls 312, rather than the gap at the aft edge 322 as in FIG. 8, faces the exhaust port 122. In some embodiments, the side wall 312 facing the exhaust port 122 tends to block a direct flow path of exhaust gas from the exhaust port 122 to re-ingestion through the air cleaning assembly 200 into the engine air intake 120.

Second, in the embodiment of FIG. 9, the forward edge 320 of the outer wall 310 is canted relative to the flanges 314. As a result, the inlet flow axis 326 is oriented partially forward at the acute angle 330 to the longitudinal axis 107 of the aircraft 100. In other words, the cross-sectional flow area at the forward edge 320 faces at least partially towards the forward flight direction 111. The canted forward edge 320 thus enables the pressure recovery device 300 to provide significant dynamic pressure recovery for the engine air intake 120 when the aircraft 100 travels in the forward flight direction 111. For embodiments in which the aircraft 100 is a helicopter, a further advantage of the acute angle 330 is that when the helicopter is in a substantially hovering condition, the pressure recovery device 300 captures downwash from the rotor assembly 114 (as shown in FIG. 7), which tends to dissipate and/or dilute exhaust gas from exhaust port 122 that otherwise would be susceptible to re-ingestion through the air cleaning assembly 200 into the engine air intake 120.

In the embodiment illustrated in FIG. 9, the side wall 312 that faces the exhaust port 122 is substantially co-extensive with the adjacent flange 314. The forward edge 320 of the outer wall 310 extends forward from the co-extensive side wall 312 and is canted downward towards the opposing side wall 312, such that a portion 215 of the air cleaning assembly 200 is not covered by the outer wall 310. However, an advantage of the embodiment of FIG. 9 is that the flanges 314 may be secured through the lip 214 (shown in FIG. 3) of the air cleaning assembly 200, such as in a retrofit process, in the same manner as described above with respect to FIGS. 3-5.

For another example, the air intake assembly 118 illustrated in FIG. 10 is similar to the air intake assembly shown in FIG. 9, except that the side wall 312 that faces in the forward flight direction 111 is substantially co-extensive with the adjacent flange 314. The forward edge 320 of the outer wall 310 extends afterward from the co-extensive side wall 312 and is canted upward towards the opposing side wall 312, such that a portion 315 of the aft flange 314 extends for a significant distance beyond the lip 214 (shown in FIG. 3) through which the flange 314 is secured. As a result, the inlet flow axis 326 is again oriented partially forward at the acute angle 330 to the longitudinal axis 107 of the aircraft 100. In some embodiments, the flanges 314 are again secured through the lip 214 (shown in FIG. 3) of the air cleaning assembly 200 in the same manner as described above with respect to FIGS. 3-5. For additional stability, the extended portion 315 of the aft flange 314 may be further secured directly to the cowling 106, for example using an adhesive, a welded joint, or an auxiliary fastener. An advantage of the embodiment of FIG. 10 is that the outer wall 310 covers substantially an entirety of the air cleaning assembly 200.

In the embodiments illustrated in FIGS. 9 and 10, the aft edge 322 is not canted, and is oriented generally perpendicular to the flanges 314. In alternative embodiments, the aft edge 322 is oriented in any suitable fashion that enables the pressure recovery device 300 to function as described herein.

For another example, the air intake assembly 118 illustrated in FIG. 11 is similar to the air intake assembly shown in FIG. 8, except that the flanges 314 of the pressure recovery device 300 are not mounted to the lip 214 (shown in FIG. 3) of the air cleaning assembly 200. Instead, the pressure recovery device 300 is mounted to the cowling 106 separately from the mounting means used for the air cleaning assembly 200. For example, the pressure recovery device 300 is mounted directly to the fuselage by welding the flanges 314 to the cowling 106 or inserting auxiliary fasteners through the flanges 314 into the cowling 106. The body of the pressure recovery device 300 is oriented such that the inlet flow axis 326, defined normal to the cross-sectional flow area of the pressure recovery device 300 at the forward edge 320 of the outer wall 310 as discussed above, is again oriented at the acute angle 330 to the longitudinal axis 107 of the aircraft 100. However, in this embodiment the acute angle 330 is achieved without any need to cant the forward edge 320 relative to the flanges 314. Instead, the flanges 314 also are oriented substantially at the acute angle 330 relative to the longitudinal axis 107.

In the embodiment illustrated in FIG. 11, similar to the embodiments illustrated in FIGS. 9 and 10, one of the side walls 312 faces the exhaust port 122 and tends to block a direct flow path of exhaust gas from the exhaust port 122 to re-ingestion through the air cleaning assembly 200 into the engine air intake 120. Also similarly, for embodiments in which the aircraft 100 is a helicopter, the acute angle 330 enables the pressure recovery device 300 to capture downwash from the rotor assembly 114 (shown in FIG. 7) when the helicopter is in a substantially hovering condition, which tends to dissipate and/or dilute exhaust gas from exhaust port 122 that otherwise would be susceptible to re-ingestion through the air cleaning assembly 200 into the engine air intake 120.

In some embodiments, the advantages of dynamic pressure recovery and inhibition of exhaust gas re-ingestion, as discussed above with respect to FIGS. 9 through 11, are obtained for the acute angle 330 in a range from about 20 degrees to about 80 degrees. In certain embodiments, the acute angle 330 being about 45 degrees provides significant exhaust gas dissipation/dilution while the aircraft 100 is in hover, while still providing significant dynamic pressure recovery for the engine air intake 120 when the aircraft 100 travels in the forward flight direction 111.

Figure 12:
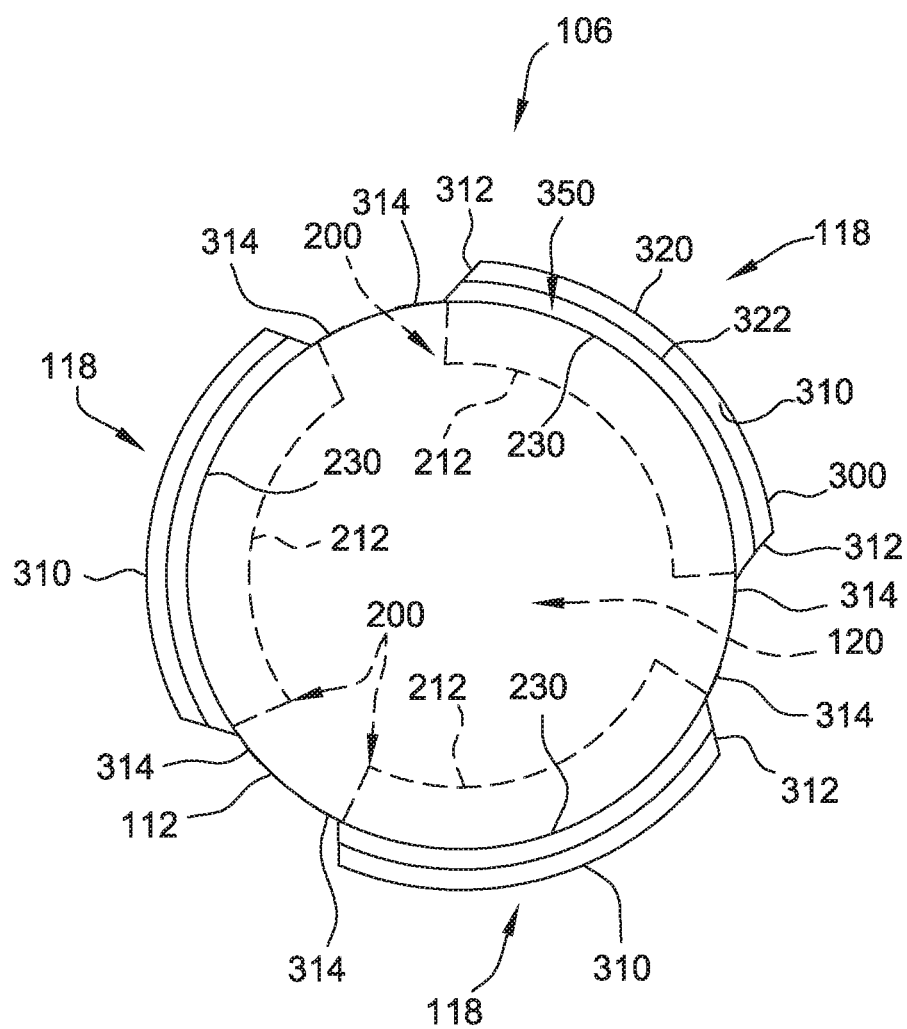
FIG. 12 is a front elevation view of an embodiment of a cowling including a plurality of air intake assemblies for use with an aircraft.

FIG. 12 is a front elevation view, i.e., with the forward flight direction 111 pointing normal to and out of the page, of another embodiment of the cowling 106 including a plurality of air intake assemblies 118. In the illustrated embodiment, the outer skin 112 of the cowling 106 defines a generally cylindrical shape having a longitudinal axis substantially parallel to the forward flight direction 111 of the aircraft 100, and the air intake assemblies 118 are arranged about a circumference of the outer skin 112. More specifically, in the illustrated embodiment, three air intake assemblies 118 are spaced evenly around the circumference of the cylinder defined by the outer skin 112. The air cleaning assembly 200 of each of the plurality of air intake assemblies 118 is configured to channel air from outside the cowling 106 into a common engine air intake 120 central to the cylinder. In alternative embodiments, the outer skin 112 of the cowling 106 defines any suitable shape, and the cowling includes any suitable number of air intake assemblies 118 arranged in any suitable fashion about the outer skin, that enables air intake assemblies 118 to function as described herein.

Each of the air intake assemblies 118 includes elements substantially identical to those described above with respect to FIGS. 2-5, except as otherwise noted below. For example, each of the air cleaning assemblies 200 includes the lip 214 (shown in FIG. 3) secured to the cowling 106, and the exterior surface 230 contoured to conform to the contour of the outer skin 112 surrounding the air intake assembly 118, as described above. Specifically, in the illustrated embodiment, the exterior surface 230 is again contoured to conform to the cylindrical shape defined by the outer skin 112 surrounding the respective air intake assembly 118. For example, the air cleaning device 220 is again the filter 221 (shown in FIG. 3) formed from a pleated filter medium, and the basket 212 has an arcuate shape concentric with the screen 222 and configured to retain the pleated folder medium having the upper contour 224 (shown in FIG. 3) in a corresponding arcuate configuration against the inner surface of the screen that defines the exterior surface 230. Likewise, a sectional shape of the outer wall 310, in each plane normal to the forward flight direction 111, is arcuate and concentric with the contour of the exterior surface 230. In alternative embodiments, the basket 212 has any suitable shape that enables the exterior surface 230 of the air cleaning assembly 200 to conform to the contour of the outer skin 112, and the outer wall 310 has any correspondingly suitable sectional shape in the plane normal to the forward flight direction 111.

Further in the illustrated embodiment, each of the pressure recovery devices 300 includes the flange 314 secured to the lip of a corresponding one of the air cleaning assemblies 200, and the outer wall 310 spaced from the exterior surface 230 of the corresponding one of the air cleaning assemblies and defining a tapered cross-sectional flow area as described above.

Although the air intake assembly 118 has been illustrated as mounted in the outer skin 112 having a substantially flat local contour (FIGS. 2-5), a simply curved local contour (FIGS. 7-11), and a generally cylindrical local contour (FIG. 12), it should be understood that embodiments of the air intake assembly 118 described herein are not so limited. Rather, the air intake assembly 118 is adaptable to any suitable local contour of the outer skin 112 of the aircraft 100. The inclusion of the pressure recovery device 300 facilitates stabilizing the pressure of intake air delivered to the engine during transitional flight and enhancing engine performance during forward flight, as described above. In some embodiments, the pressure recovery device 300 extending over at least a portion of the basket 212 also facilitates shielding the filter 221 from ultraviolet radiation from the sun. Moreover, the pressure recovery device 300 may be added to existing air cleaning assemblies 200 in a retrofit process as described above, advantageously improving a performance envelope of existing aircraft in a relatively fast and inexpensive fashion.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A rotorcraft comprising:
a fuselage;
a rotor assembly;
an engine exhaust port extending through the fuselage;
an air intake extending through the fuselage forward from, and adjacent to, the engine exhaust port;
an air cleaning assembly positioned over the air intake; and
a pressure recovery device including an outer wall positioned above the air cleaning assembly and defining a cross-section flow area between the pressure recovery device and the air cleaning assembly, the cross-sectional flow area capturing downwash from the rotor assembly when the rotorcraft is hovering and during transition to forward flight, wherein:
a distance from a forward edge of the outer wall to the air cleaning assembly is greater than a distance from an aft edge of the outer wall to the air cleaning assembly; and
an inlet flow axis is defined normal to the cross-sectional flow area of the pressure recovery device at the forward edge, and is oriented upward at an acute angle relative to the downwash.

2. The rotorcraft of claim 1, wherein the air cleaning assembly further includes a lip secured to an outer skin of the fuselage, and the pressure recovery device further includes opposing flanges mounted to the lip.

3. The rotorcraft of claim 2, wherein the forward edge of the outer wall of the pressure recovery device is canted relative to the flanges.

4. The rotorcraft of claim 1, wherein a gap is defined between the aft edge of the outer wall and the air cleaning assembly, the gap sized to enable passage of particulates through the pressure recovery device.

5. The rotorcraft of claim 1, wherein the pressure recovery device further includes opposing flanges, and wherein the flanges are oriented substantially at the acute angle relative to the downwash.

6. The rotorcraft of claim 1, wherein the pressure recovery device further includes opposing flanges, and wherein the flanges are mounted to the fuselage separately from the air cleaning assembly.

7. The rotorcraft of claim 1, wherein the cross-sectional flow area of the pressure recovery device generally tapers between the forward edge of the outer wall and the aft edge of the outer wall.

8. The rotorcraft of claim 1, wherein the forward edge of the outer wall defines an airfoil shape.

9. The rotorcraft of claim 1, wherein the air cleaning assembly further includes a filter interposed between ambient air and the air intake.

10. The rotorcraft of claim 1, wherein the air cleaning assembly further includes:
a basket sized to be received in the air intake in a clearance fit, wherein the basket defines an interior cavity sized to receive a filter; and
a lip extending around at least a portion of a perimeter of the basket.

11. The rotorcraft of claim 10, wherein the air cleaning assembly further includes a screen configured to cooperate with the basket to securely retain the filter in place within the basket, and wherein the screen defines an exterior surface of the air cleaning assembly.

12. The rotorcraft of claim 10, wherein the filter is formed from a pleated filter medium.

13. The rotorcraft of claim 12, wherein the pleated filter medium has a particle removal efficiency of at least about 96% of AC Coarse dust particles and at least about 95% of AC Fine dust particles.

14. The rotorcraft of claim 10, wherein the lip of the air cleaning assembly is substantially flush with an outer skin of the fuselage.

15. A method of shielding an air intake of a rotorcraft against engine exhaust gas recirculation, wherein the rotorcraft includes a fuselage, a rotor assembly, an engine exhaust port extending through the fuselage, and an air intake extending through the fuselage forward from, and adjacent to, the engine exhaust port, the method comprising:
positioning a pressure recovery device over the air intake, wherein:
an air cleaning assembly is interposed between ambient air and the air intake,
a cross-sectional flow area is defined between the device and the air cleaning assembly, the flow area capturing downwash from the rotor assembly when the rotorcraft is hovering and during transition to forward flight, and
a distance from a forward edge of an outer wall of the pressure recovery device to the air cleaning assembly is greater than a distance from an aft edge of the outer wall to the air cleaning assembly; and
orienting an inlet flow axis of the pressure recovery device upward at an acute angle relative to downwash from the rotor assembly when the rotorcraft is hovering, wherein the inlet flow axis is defined normal to the cross-sectional flow area of the pressure recovery device at the forward edge.

16. The method of claim 15, wherein the air cleaning assembly further includes a lip secured to an outer skin of the fuselage, the method further comprising mounting opposing flanges of the pressure recovery device to the lip.

17. The method of claim 16, wherein the forward edge of the outer wall of the pressure recovery device is canted relative to the flanges, causing the inlet flow axis to be oriented at the acute angle when the flanges are mounted to the lip.

18. The method of claim 15, wherein the pressure recovery device further includes opposing flanges, and wherein orienting the inlet flow axis upward at the acute angle comprises orienting the flanges substantially at the acute angle relative to the downwash.

19. The method of claim 15, wherein the pressure recovery device further includes opposing flanges, the method further comprising mounting the flanges to the fuselage separately from the air cleaning assembly.

20. The method of claim 15, further comprising:
removing each of a plurality of initial fasteners from a corresponding pair of aligned openings defined respectively in a lip of the air cleaning assembly and an outer skin of the fuselage, wherein positioning the pressure recovery device further comprises registering each of a plurality of openings defined in a flange of the pressure recovery device with one of the pairs of aligned openings to form a corresponding aligned trio of openings; and
installing a respective replacement fastener into each aligned trio of openings.

* * * * *